Oct. 7, 1958  F. M. EVANS  2,855,230
SCREW LOCKING DEVICE
Filed Jan. 7, 1957
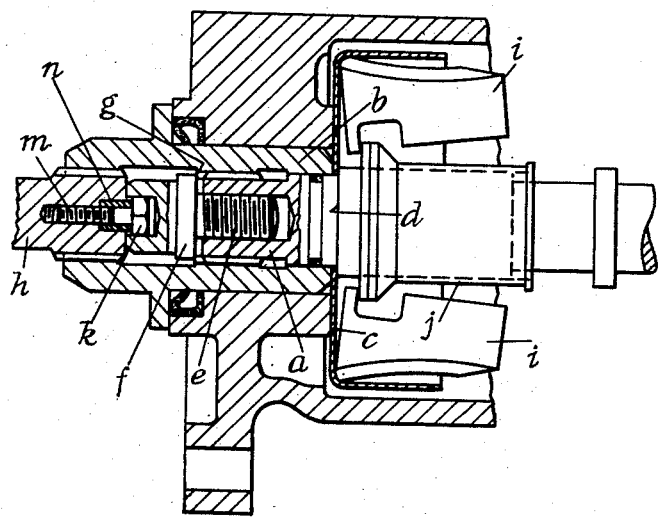
Inventor
F. M. Evans
By Glascock Downing Seebold,
Attys.

United States Patent Office 2,855,230
Patented Oct. 7, 1958

2,855,230

SCREW LOCKING DEVICE

Fraser Mackie Evans, Acton, London, England, assignor to C. A. V. Limited, London, England Application January 7, 1957, Serial No. 632,829

Claims priority, application Great Britain January 13, 1956

2 Claims. (Cl. 287—53)

A known form of mechanism comprises a pair of externally splined coaxial spindles the adjacent ends of which are engaged with an internally splined sleeve, one of the spindles being secured to the sleeve by a clamping screw which is engaged with an axial hole in this spindle and is provided with a head or washer which abuts against an annular shoulder in the sleeve. For some purposes it is essential to obviate accidental slackening of the clamping screw, especially when a part of a mechanism, for example a centrifugal governor mounted on the associated spindle, is secured between the sleeve and spindle by the action of the screw.

The object of the present invention is to provide in a mechanism as above described, a simple device for reliably locking the clamping screw.

A locking device in accordance with the invention consists of a coupling screw adapted to interengage the adjacent ends of one of the spindles and the clamping screw secured to the other spindle.

In one example of a mechanism of the form above described, and required for use in a liquid fuel injection pump for an internal combustion engine as illustrated by the accompanying drawing, the rotary actuating spindle $a$ of the pump has mounted on it a centrifugal speed governor. At one end this spindle is externally splined and is engaged with one end of an internally splined sleeve $b$. A part $c$ of the governor is clamped between one end of the sleeve and a shoulder $d$ on the spindle, by a screw $e$ which is engaged with an axial hole in one end of the spindle and is provided with a head $f$ (or washer) which abuts against an internal shoulder $g$ in the sleeve. The outer end of the sleeve is engaged by one end of an externally splined driving spindle $h$. In this example, the part $c$ of the governor carries centrifugally operable parts $i$ which by their pivotal movement on the part $c$ can actuate a slidable sleeve $j$ on the spindle $a$, the sleeve $j$ serving to transmit movement from the governor to a pump control mechanism.

In one manner of securing the clamping screw $e$ in accordance with the invention, the head of this screw has formed in it an axial hole of polygonal form, and this hole is occupied by a correspondingly shaped head $k$ on a coupling screw $m$ which is engaged with an axial hole in the adjacent end of the driving spindle $h$. Preferably, and as shown, the axial hole in the driving spindle $h$ is counterbored to accommodate a tubular distance piece $n$ through which the coupling screw $m$ extends and which, when the latter is tightened with its head bearing against the adjacent end of the distance piece, affords sufficient resiliency to permit alignment of the flats on the head of the coupling screw with those of the polygonal hole in the head of the clamping screw $e$.

The arrangement is such that after the clamping screw $e$ has been tightened for securing together the sleeve $g$ and the pump spindle $a$, and after the coupling screw has been attached to the driving spindle $h$, the coupling screw is adjusted to a position in which its head can be engaged with the polygonal hole in the clamping screw when the spindle $h$ is engaged with the sleeve $b$. As the spindle $h$ has no angular freedom relatively to the sleeve, the coupling screw effectively prevents accidental slackening of the clamping screw.

In an alternative arrangement the disposition of the coupling screw is reversed, in which case this screw is secured to the clamping screw and its head is engaged with a polygonal hole in the driving spindle.

Whilst the invention is more particularly required for the specific mechanism above described, it may be applied in like manner to other analogous mechanisms.

Having thus described my invention what I claim as new and desire to secure by Letters Patent is:

1. A mechanism comprising in combination a pair of externally splined coaxial spindles, an internally splined sleeve engaging adjacent ends of said spindles and provided with an internal annular shoulder, a clamping screw in screw thread engagement with an axial bore in one of said spindles and provided with a part which serves by abutting against said shoulder to secure the last mentioned spindle to said sleeve, and a coupling screw provided with a polygonal head and engaging complementary parts formed by said clamping screw and the adjacent end of the other of said spindles, one of said complementary parts being provided with an axial socket corresponding in shape to and accommodating said polygonal head of said coupling screw, and the other of said complementary parts being provided with an axial bore in screw thread engagement with said coupling screw.

2. A mechanism according to claim 1, and having a tubular distance piece through which said coupling screw extends, the axial bore in screw thread engagement with said coupling screw being counterbored to accommodate said distance piece.

References Cited in the file of this patent

UNITED STATES PATENTS 2,757,857     Savin _____ Aug. 7, 1956

FOREIGN PATENTS 940,078     Germany _____ Mar. 8, 1956